United States Patent
Augelli et al.

(10) Patent No.: US 9,936,724 B2
(45) Date of Patent: Apr. 10, 2018

(54) SWEETENER COMPOSITIONS

(71) Applicant: Givaudan, S.A., Vernier (CH)

(72) Inventors: Jenifer Augelli, Cincinnati, OH (US); Stefan Michael Furrer, Cincinnati, OH (US); Esther Van Ommeren, Almere (NL); Ioana Maria Ungureanu, Cincinnati, OH (US)

(73) Assignee: Givaudan, S.A., Vernier (CH)

( * ) Notice: Subject to any disclaimer, the term of this patent is extended or adjusted under 35 U.S.C. 154(b) by 0 days.

(21) Appl. No.: 15/326,516

(22) PCT Filed: Aug. 4, 2015

(86) PCT No.: PCT/EP2015/067907
§ 371 (c)(1),
(2) Date: Jan. 16, 2017

(87) PCT Pub. No.: WO2016/020362
PCT Pub. Date: Feb. 11, 2016

(65) Prior Publication Data
US 2017/0208841 A1 Jul. 27, 2017

Related U.S. Application Data

(60) Provisional application No. 62/033,314, filed on Aug. 5, 2014.

(51) Int. Cl.
*A23L 2/60* (2006.01)
*A23L 27/30* (2016.01)
*A23L 27/00* (2016.01)

(52) U.S. Cl.
CPC .......... *A23L 2/60* (2013.01); *A23L 27/36* (2016.08); *A23L 27/39* (2016.08); *A23L 27/84* (2016.08)

(58) Field of Classification Search
CPC . A23L 2/60; A23L 27/39; A23L 27/84; A23L 27/36
See application file for complete search history.

(56) References Cited

U.S. PATENT DOCUMENTS 5,620,707 A    4/1997  Sanker et al.
7,807,208 B2  10/2010  Magomet et al.
2007/0082102 A1    4/2007  Magomet et al.
2007/0116820 A1*   5/2007  Prakash .......... A23G 1/30
                                              426/548
2008/0227887 A1    9/2008  Ley et al.
2011/0189108 A1    8/2011  Backes et al.
2012/0245393 A1*   9/2012  Nandy ............ C07C 41/18
                                              568/334

FOREIGN PATENT DOCUMENTS

EP    0 908 107 A2    4/1999
JP    H 10-276712 A   10/1998
WO    WO 2007/107596 A1    9/2007

OTHER PUBLICATIONS

Economides, C., Adam, K.-P. 1998. "Lipophilic Flavonoids from the Fern *Woosdia scopulina*." Phytochemistry. vol. 49, pp. 859-862.*

Guzman, J. D., et al. 2010. "Anti-tubercular screening of natural products from Colombian plants: 3-methoxynordomesticine, an inhibitor of MurE ligase of *Mycobacterium tuberculosis*." J. Antimicrob. Chemother. vol. 65, pp. 2101-2107.*

PCT/EP2015/067907—International Search Report, dated Oct. 26, 2015.

PCT/EP2015/067907—International Written Opinion, dated Oct. 26, 2015.

GB1415565.9—Great Britain Search Report, May 11, 2015.

Batt, D G, et al., "2'-Substituted Chalcone Derivatives as Inhibitors of Interleukin-1 Biosynthesis", Journal of Medicinal Chemistry, May 1, 1993, pp. 1434-1442, vol. 36, No. 10.

Economides, C., et al., "Ligohilic Flavonoids from the Fern *Woodsia scopulina*", Phytochemistry, Oct. 1, 1998, pp. 859-862, vol. 49, No. 3.

Schiffman, S. S., et al., "Investigation of Synergism in Binary Mixtures of Sweeteners", Brain Research Bulletin, Jan. 20, 1995, pp. 105-120, vol. 38, No. 2.

Singapore Patent Application No. 11201610860U—Written Opinion, dated Nov. 27, 2017.

Plazas, et al., "Isolated Flavonoids From Inflorescences of *Piper hispidum Kunth* (Piperaceae) and Acetylated Derivatives", Rev. Colomb. Quirn., vol. 37, No. 2, pp. 135-144, 2008.

* cited by examiner

*Primary Examiner* — Nikki H. Dees
(74) *Attorney, Agent, or Firm* — Curatolo Sidoti Co., LPA; Joseph G. Curatolo; Salvatore A. Sidoti

(57) ABSTRACT

The use of 3-phenyl-1-(2,4,6-trimethoxyphenyl)propan-1-one in an edible composition for suppressing, eliminating or reducing undesirable off-tastes.

8 Claims, No Drawings

SWEETENER COMPOSITIONS

CROSS REFERENCE TO RELATED APPLICATIONS

This application is a national stage application of International Application No. PCT/EP2015/067907, filed 4 Aug. 2015, which claims priority from U.S. Provisional Patent Application No. 62/033,314, filed 5 Aug. 2014, which applications are incorporated herein by reference.

The present disclosure relates to a taste-masking compound, as well as flavour compositions and edible compositions containing same. In particular, the invention relates to 3-phenyl-1-(2,4,6-trimethoxyphenyl)propan-1-one and compositions useful for suppressing, eliminating or reducing undesirable off-tastes of edible compositions or ingredients contained in edible compositions.

Off-taste is a common and costly problem for the food industry. For many years, the use of salt, sugar or spices helped mask off-tastes. However, the relatively recent tendency to reduce or eliminate basic ingredients like salt or sugar from food for reasons related to health and wellness, as well as the increased use of functional ingredients and nutraceuticals, has increased the need for new taste-masking or taste-modulating technologies.

Undesired tastes or off tastes can be intrinsically present in edible compositions. The most common examples are bitter tastes from vegetables, such as brussel sprouts or broccoli, or sourness in certain foods, such as orange juice or yogurt. There are many naturally occurring bioactive compounds that although eliciting bitterness, nevertheless have positive health effects. These compounds include flavanoids, polyphenols, peptides, minerals or terpenes. Other sources of off-tastes can be related to microbial metabolites, enzymatic degradation, or to the effects of heat or oxidation on edible compositions. Undesired tastes or off-tastes can also be introduced into edible compositions as the result of adding certain ingredients such as vitamins, minerals, amino acids, proteins, peptides or antioxidants, as well as sugar and salt-substitutes. All of these ingredients might be employed as additives with the intention of improving the health and safety of food or for reasons of nourishment, but they can also carry with them undesirable tastes or off-tastes.

In the case of sugar replacers, the tastes they impart can present different temporal profiles, flavour-profiles or adaptation behaviors compared with the sugars which they replace, in whole or in part. For example, the sweet taste of natural and synthetic high-intensity sweeteners (HIS), is generally slower in onset and longer in duration than the sweet taste produced by sugar (sweet, short-chain, soluble carbohydrates, including glucose, fructose, sucrose, maltose and lactose) or high fructose corn syrups (HFCS) which is known as a replacement for sugar, and this can change the taste balance of an edible composition containing them. This can create unbalanced temporal taste profiles. In addition to the difference in temporal profile, high-intensity sweeteners generally exhibit lower maximal response than sugar; off-tastes including bitter, metallic, cooling, astringent, licorice-like taste and/or sweetness, which diminishes on iterative tasting.

As used herein the term "high-intensity sweetener", includes any synthetic sweetener or sweetener found in nature, which may be in raw, extracted, purified, or any other form, singularly or in combination thereof. High-intensity sweetener are compounds or mixtures of compounds which are many times (about 30 times and more, e.g. 100-800 times and more) sweeter than sucrose. For example, sucralose is about 600 times sweeter than sucrose, sodium cyclamate about 30 times, Aspartame about 160-200 times, and thaumatin about 2 000 times sweeter.

Further Examples of high-intensity sweeteners are acesulfame potassium, neotame, saccharine, swingle and stevia extracts, including enzymatically and chemically modified stevia extracts, mono-, di- and polyglycosylated steviol compounds, for example, Rebaudioside A (hereinafter "Reb A"), Rebaudioside B, Rebaudioside C, Rebaudioside D, Rebaudioside E, and Rebaudioside F, chemically and enzymatically modified steviosides, for example, transglucosylated sweet glycosides as disclosed in US2007082102. Further examples of steviol glycosides are Rebaudioside G, Rebaudioside X and Rebaudioside H and Rebaudioside M.

Swingle (also known as Luo Han Go (LHG) extract or *Siraitia grosvenorii* extract) contains various naturally-derived terpene glycosides, in particular various mogrosides including mogroside IV, mogroside V, siamenoside I, and 11-oxo mogroside V that impart high-intensity sweetness.

Of these, natural sweeteners such as stevia extracts have become favored as a result of the recent trend toward natural products.

However, all high-intensity sweeteners have undesirable after-taste in the form of off-notes, such as liquorice-like after-taste, and/or lingering sweetness. In the particular case of Reb A, this takes the form of a combination of an undesirable lingering sweetness and a liquorice-like after-taste. This after-taste detracts from the desired sugar-like sweetness and thus effectively masking undesirable tastes or off-tastes in edible compositions is key to consumer acceptance of many edible compositions.

Even though several attempts have been made to overcome the problems described above, there still remains a need for even better solutions.

Surprisingly inventors found that the addition of 3-phenyl-1-(2,4,6-trimethoxy-phenyl)propan-1-one (its structural formula is shown below) to edible compositions comprising high-intensity sweeteners result in composition wherein the off-note of said HIS is less apparent or even unnoticeable.

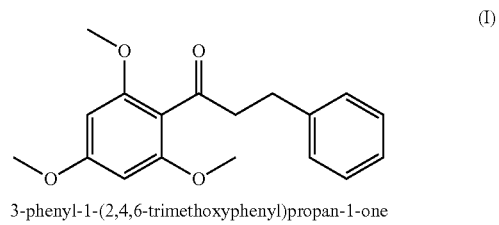 [SMILES: COc1cc(OC)c(C(=O)CCc2ccccc2)c(OC)c1]

3-phenyl-1-(2,4,6-trimethoxyphenyl)propan-1-one

3-Phenyl-1-(2,4,6-trimethoxyphenyl)propan-1-one can be prepared by known methods using commercially available starting materials, reagents and solvents. The compound may, for example, be formed by the reaction of benzaldehyde with 1-(2,4,6-trimethoxyphenyl)ethanone in the presence of a base followed by reduction, as depicted in the scheme below.

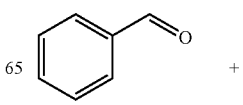

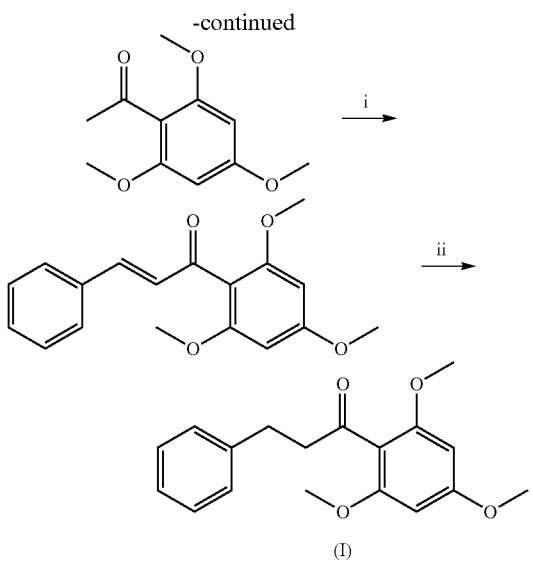

i): KOH/EtOH;
ii): H$_2$/ Pd/C

In a first aspect there is provided a method of reducing or eliminating perceived off-notes associated with high-intensity sweeteners, comprising the step of incorporating into a product comprising HIS an off-note-masking amount of 3-phenyl-1-(2,4,6-trimethoxyphenyl)propan-1-one.

Not only does 3-phenyl-1-(2,4,6-trimethoxyphenyl)propan-1-one show particularly good masking properties, but also the compound has a much higher solubility in water than other dihydrochalcones, which makes it particularly suitable for use in aqueous media, such as food and beverages. For example, 1-(2-hydroxy-4,6-dimethoxyphenyl)-3-(4-methoxyphenyl)propan-1-one has a solubility below 5 ppm (in water at room temperature) and was found to have a significantly lower masking effect, compared to that of the compound of formula (I), which was found to be soluble to an extent greater than 30 ppm. As a further example, phloretin (3-(4-hydroxyphenyl)-1-(2,4,6-trihydroxyphenyl)propan-1-one), which was found to be soluble to a similar extent as 3-phenyl-1-(2,4,6-trimethoxyphenyl)propan-1-one, did not provide masking properties when used at these concentrations.

The quantities in which 3-phenyl-1-(2,4,6-trimethoxyphenyl)propan-1-one may be added to edible compositions may vary within wide limits and depend, inter alia, on the nature of the edible compositions, on the particular desired taste-modifying effect, as well as the nature and concentration of the ingredient or ingredients in the edible compositions that are responsible for the particular unwanted taste that must be eliminated, suppressed or reduced. It is well within the purview of the person skilled in the art to decide on suitable quantities of the compounds to incorporate into an edible composition depending on the end use and effect required.

Typical non-limiting concentrations of 3-phenyl-1-(2,4,6-trimethoxyphenyl)propan-1-one employed in edible compositions are 5 to 30 ppm, for example, between 10 ppm to 25 ppm (e.g. 15 or 20 ppm).

There is provided in one embodiment an edible composition comprising from 80 to 500 ppm g of a HIS, or mixtures thereof and 10 to 25 ppm of 3-phenyl-1-(2,4,6-trimethoxy-phenyl)propan-1-one. For example, the edible composition comprises a mixture of two, three, four or even five high-intensity sweeteners.

In one embodiment there is provided an edible composition comprising 25 ppm to 350 ppm acesulfame K (e.g. about 40-200 ppm) and up to 300 ppm (50, 100, 150, 200, 250 ppm) of a second HIS, such as aspartame or sucralose, and 10 to 25 ppm of 3-phenyl-1-(2,4,6-trimethoxy-phenyl)propan-1-one.

In a further embodiment there is provided an edible composition comprising up to 250 ppm acesulfame K and at least two other HIS, and 10 to 25 ppm of 3-phenyl-1-(2,4,6-trimethoxy-phenyl)propan-1-one.

In a further embodiment there is provided an edible composition comprising 50-250 ppm aspartame and at least one other HIS, and 10 to 25 ppm of 3-phenyl-1-(2,4,6-trimethoxy-phenyl)propan-1-one.

In a further embodiment there is provided an edible composition comprising from 80 to 500 ppm g of a HIS, or mixtures thereof, sugar and 10 to 25 ppm of 3-phenyl-1-(2,4,6-trimethoxy-phenyl)propan-1-one.

The compound may be added as a single ingredient to an edible composition. Alternatively, it may be added to an edible composition as part of a flavour composition containing one or more additional ingredients known in the art, such as carrier material, adjuvant, flavor ingredients, or it may be admixed with a high-intensity sweetener composition and then added to the food or beverage.

The compounds may be employed in any physical form. It may be used in neat form, in the form of a stock solution, in the form of an emulsion, or it may be used in a powder form. If the compound is used in the form of a powder, the powder form can be produced by a dispersive evaporation process, such as a spray drying process as is more fully described below. The powder form may be prepared by subjecting a liquid formulation containing 3-phenyl-1-(2,4,6-trimethoxyphenyl)propan-1-one to a dispersive evaporation process. The liquid formulation may comprise a solution, suspension or emulsion comprising 3-phenyl-1-(2,4,6-trimethoxyphenyl)propan-1-one. In particular, the liquid formulation may take the form of the stock solution described hereinabove.

Flavour ingredients include, but not limited, to natural flavours, artificial flavours, spices, seasonings, and the like. Flavour ingredients include synthetic flavour oils and flavouring aromatics and/or oils, oleoresins, essences, distillates, and extracts derived from plants, leaves, flowers, fruits, and so forth, and combinations comprising at least one of the foregoing.

Flavour oils include spearmint oil, cinnamon oil, oil of wintergreen (methyl salicylate), peppermint oil, Japanese mint oil, clove oil, bay oil, anise oil, *eucalyptus* oil, thyme oil, cedar leaf oil, oil of nutmeg, allspice, oil of sage, mace, oil of bitter almonds, and *cassia* oil; useful flavours include artificial, natural and synthetic fruit flavours such as vanilla, and citrus oils including lemon, orange, lime, grapefruit, yazu, sudachi, and fruit essences including apple, pear, peach, grape, blueberry, strawberry, raspberry, cherry, plum, prune, raisin, cola, guarana, neroli, pineapple, apricot, banana, melon, apricot, ume, cherry, raspberry, blackberry, tropical fruit, mango, mangosteen, pomegranate, *papaya* and the like.

Additional exemplary flavours imparted by a flavouring agent include a milk flavour, a butter flavour, a cheese flavour, a cream flavour, and a yogurt flavour; a vanilla flavour; tea or coffee flavours, such as a green tea flavour, an oolong tea flavour, a tea flavour, a cocoa flavour, a chocolate flavour, and a coffee flavour; mint flavours, such as a peppermint flavour, a spearmint flavour, and a Japanese mint flavour; spicy flavours, such as an asafetida flavour, an ajowan flavour, an anise flavour, an *angelica* flavour, a fennel flavour, an allspice flavour, a cinnamon flavour, a chamomile flavour, a mustard flavour, a cardamom flavour, a caraway flavour, a cumin flavour, a clove flavour, a pepper flavour, a coriander flavour, a *sassafras* flavour, a savoury flavour, a Zanthoxyli Fructus flavour, a *perilla* flavour, a juniper berry flavour, a ginger flavour, a star anise flavour, a horseradish flavour, a thyme flavour, a tarragon flavour, a dill flavour, a *capsicum* flavour, a nutmeg flavour, a basil flavour, a marjoram flavour, a rosemary flavour, a bayleaf flavour, and a wasabi (Japanese horseradish) flavour; a nut flavour such as an almond flavour, a hazelnut flavour, a macadamia nut flavour, a peanut flavour, a pecan flavour, a pistachio flavour, and a walnut flavour; alcoholic flavours, such as a wine flavour, a whisky flavour, a brandy flavour, a rum flavour, a gin flavour, and a liqueur flavour; floral flavours; and vegetable flavours, such as an onion flavour, a garlic flavour, a cabbage flavour, a carrot flavour, a celery flavour, mushroom flavour, and a tomato flavour.

In some embodiments, said flavor ingredients include aldehydes and esters such as cinnamyl acetate, cinnamaldehyde, citral diethylacetal, dihydrocarvyl acetate, eugenyl 49 formate, p-methylamisol, and so forth can be used. Further examples of aldehyde flavourings include acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavours), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), and the like.

Further examples of other flavour ingredients can be found in "Chemicals Used in Food Processing", publication 1274, pages 63-258, by the National Academy of Sciences.

Flavour ingredients can also include salt tastants, umami tastants, and savoury flavour compounds. Non limiting examples include: NaCl, KCl, MSG, guanosine monophosphate (GMP), inosin monophsphate (IMP), ribonucleotides such as disodium inosinate, disodium guanylate, N-(2-hydroxyethyl)-lactamide, N-lactoyl-GMP, N-lactoyl tyramine, gamma amino butyric acid, allyl cysteine, 1-(2-hydroxy-4-methoxylphenyl)-3-(pyridine-2-yl)propan-1-one, arginine, potassium chloride, ammonium chloride, succinic acid, N-(2-methoxy-4-methyl benzyl)-N'-(2-(pyridin-2-yl)ethyl) oxalamide, N-(heptan-4-yl)benzo(D)(1,3)dioxole-5-carboxamide, N-(2,4-dimethoxybenzyl)-N'-(2-(pyridin-2-yl)ethyl) oxalamide, N-(2-methoxy-4-methyl benzyl)-N'-2(2-(5-methyl pyridin-2-yl)ethyl) oxalamide, cyclopropyl-E,Z-2,6-nonadienamide.

The carrier material may be employed in compositions according to the invention to encapsulate or to entrap in a matrix 3-phenyl-1-(2,4,6-trimethoxyphenyl)propan-1-one alone or a composition comprising said compound. The role of the carrier material may be merely that of a processing aid or a bulking agent, or it might be employed to shield or protect the other components from the effects of moisture or oxygen or any other aggressive media. The carrier material might also act as a means of controlling the release of the entrapped ingredients in food applications.

Carrier materials may include mono, di- or trisaccharides, natural or modified starches, hydrocolloids, cellulose derivatives, polyvinyl acetates, polyvinylalcohols, proteins or pectins. Example of particular carrier materials include sucrose, glucose, lactose, levulose, fructose, maltose, ribose, dextrose, isomalt, sorbitol, mannitol, xylitol, lactitol, maltitol, pentatol, arabinose, pentose, xylose, galactose, maltodextrin, dextrin, chemically modified starch, hydrogenated starch hydrolysate, succinylated or hydrolysed starch, agar, carrageenan, gum arabic, gum accacia, tragacanth, alginates, methyl cellulose, carboxymethyl cellulose, hydroxyethyl cellulose, hydroxypropylmethyl cellulose, derivatives and mixtures thereof. Of course, the skilled person will appreciate that the cited materials are hereby given by way of example and are not to be interpreted as limiting the invention.

By "flavour adjuvant" is meant an ingredient capable of imparting additional added benefit to compositions of the present invention such as a colour, light resistance, chemical stability and the like. Suitable adjuvants include solvents (including water, alcohol, ethanol, triacetine, oils, fats, vegetable oil and miglyol), binders, diluents, disintegrating agents, lubricants, colouring agents, preservatives, antioxidants, emulsifiers, stabilisers, anti-caking agents, and the like.

In a particular embodiment, the flavour composition comprises an anti-oxidant. Said anti-oxidants may include vitamin C, vitamin E, rosemary extract, antrancine, butylated hydroxyanisole (BHA) and butylated hydroxytoluene (BHT).

Further examples of such carriers or adjuvants suitable for flavour compositions may be found in for example, "Perfume and Flavour Materials of Natural Origin", S. Arctander, Ed., Elizabeth, N.J., 1960; in "Perfume and Flavour Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988.

Other suitable and desirable ingredients of flavour compositions are described in standard texts, such as "Handbook of Industrial Chemical Additives", ed. M. and I. Ash, $2^{nd}$ Ed., (Synapse 2000).

3-Phenyl-1-(2,4,6-trimethoxyphenyl)propan-1-one may be used in any kind of consumable. Non-limiting examples of such consumables include:

wet/liquid soups regardless of concentration or container, including frozen soups. For the purpose of this definition soup(s) means a food prepared from meat, poultry, fish, vegetables, grains, fruit and other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage). Soup may be used as an ingredient for preparing other meal components and may range from broths (consommé) to sauces (cream or cheese-based soups).

dehydrated and culinary foods, including cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology);

meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes.

meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen.

beverages, including beverage mixes and concentrates, including but not limited to, alcoholic and non-alcoholic ready to drink and dry powdered beverages, carbonated and non-carbonated beverages, e.g., sodas, fruit or vegetable juices, alcoholic and non-alcoholic beverages.

confectionery products, e.g., cakes, cookies, pies, candies, chewing gums, gelatins, ice creams, sorbets, puddings, jams, jellies, salad dressings, and other condiments, cereal, and other breakfast foods, canned fruits and fruit sauces and the like.

milk, cheese, yoghurt and other dairy products.

The disclosure is further described with reference to the following non-limiting examples.

EXAMPLE 1-3: TEST ON NON-FLAVOURED BEVERAGES CONTAINING HIGH INTENSITY SWEETENER(S)

The following aqueous solutions were prepared (concentration given is ppm):

|  | 1-A | 1-B | 2-A | 2-B | 3-A | 3-B |
|---|---|---|---|---|---|---|
| Sucralose | 160 | 160 | 0 | 0 | 0 | 0 |
| Reb A | 0 | 0 | 300 | 300 | 250 | 250 |
| Sodium citrate | 120 | 120 | 0 | 0 | 0 | 0 |
| Citric acid | 1000 | 1000 | 500 | 500 | 0 | 0 |
| 3-phenyl-1-(2,4,6-trimethoxy-phenyl)propan-1-one | 0 | 10 | 0 | 20 | 0 | 20 |

A group of trained panelists have been asked to describe the pair of samples (1 A and B, 2 A and B, 3 A and B) focusing on the licorice and sweet lingering off notes known from the sweetener, which have been presented blind. The results are given below.

The majority of panelist preferred sample 1-B. They describe sample 1-B compared to 1-A as less metallic, and having less sweet lingering off notes. A reduction of licorice and reduction of acid perception was also observed.

The majority of panelist preferred sample 2-B. They describe sample 2-B compared to 2-A as having less sweet lingering off notes. A reduction of licorice was also observed.

The majority of panelist preferred sample 3-B. They describe sample 3-B compared to 3-A as having less sweet lingering off notes. A reduction of licorice was also observed.

EXAMPLE 4-5: STRAWBERRY FLAVOURED YOGHURT CONTAINING HIGH INTENSITY SWEETENER(S)

The following 0% fat yoghurts were prepared (concentration given is ppm):

|  | 4-A | 4-B | 5-A | 5-B |
|---|---|---|---|---|
| Sucralose | 0 | 0 | 120 | 120 |
| Reb A | 280 | 280 | 0 | 0 |
| Acesulfame K | 0 | 0 | 80 | 80 |
| Strawberry flavour | 1000 | 1000 | 1000 | 1000 |
| 3-phenyl-1-(2,4,6-trimethoxy-phenyl)propan-1-one | 0 | 20 | 0 | 10 |

A group of trained panelists have been asked to describe the pair of samples (4 A and B, and 5 A and B) focusing on the licorice and sweet lingering off notes known from the sweetener, which have been presented blind. The results are given below.

The majority of panelist preferred sample 4-B. They describe sample 4-B compared to 4-A as having less sweet lingering and licorice. A reduction of astringency and sweetness was also observed and the strawberry impact was slightly suppressed.

The majority of panelist preferred sample 5-B. They describe sample 5-B compared to 5-A as having less sweet lingering and licorice. A reduction of astringency, reduction of sweetness and a decreased bitterness was also observed. The strawberry impact was slightly suppressed.

The invention claimed is:

1. A method of reducing or eliminating perceived off-notes associated with the use of high-intensity sweeteners, comprising the step of incorporating into a product comprising high-intensity sweetener(s) an off-note-masking amount of 3-phenyl-1-(2,4,6-trimethoxy phenyl)propan-1-one.

2. The method according to claim 1, in which the amount of 3-phenyl-1-(2,4,6-trimethoxyphenyl)propan-1-one incorporated into the product is from 5 to 30 ppm.

3. An edible composition comprising a high-intensity sweetener, and an off-taste masking portion of 3-phenyl-1-(2,4,6-trimethoxyphenyl)propan-1-one.

4. The edible composition according to claim 3 wherein the high-intensity sweetener is selected from sucralose, sodium cyclamate, Aspartame, thaumatin, acesulfame potassium, neotame, saccharine, swingle extract, stevia extracts, monoglycosylated steviol compounds, di glycosylated steviol compounds, polyglycosylated steviol compounds, chemically modified steviosides, enzymatically modified steviosides, or a mixture thereof.

5. The edible composition according to claim 3, in which the amount of 3-phenyl-1-(2,4,6-trimethoxyphenyl)propan-1-one is from 5 to 30 ppm.

6. The edible composition according to claim 5, further comprising sugar.

7. The edible composition according to claim 4, further comprising sugar.

8. The edible composition according to claim 3, further comprising sugar.

* * * * *